3,825,653
PROCESS FOR PREPARING SINTERABLE
ALUMINUM TITANATE POWDER
Walter K. Duerksen, Norris, and Cressie E. Holcombe, Jr., and Margaret K. Morrow, Oak Ridge, Tenn., assignors to the United States of America as represented by the United States Atomic Energy Commission
No Drawing. Filed Sept. 11, 1972, Ser. No. 288,228
Int. Cl. C01g 23/00
U.S. Cl. 423—598        3 Claims

ABSTRACT OF THE DISCLOSURE

Sinterable aluminum titanate powder is prepared by coprecipitating halide or alkoxide compounds of aluminum and titanium as a hydroxide. The resulting hydrated aluminum titanium hydroxide is dried and then calcined in air to form the powder. Slip casting or isostatic pressing techniques together with sintering may be employed to prepare products of aluminum titanate.

---

The present invention relates generally to sinterable aluminum titanate powder and products therefrom, and more particularly to the preparation of such powder by the coprecipitation of aluminum and titanium compounds in halide or alkoxide form. This invention was made in the course of, or under, a contract with the U.S. Atomic Energy Commission.

Structural and special purpose ceramics capable of use in high temperature environments are needed in the areospace and nuclear industries. Aluminum titanate is known for its high refractoriness (melting temperature), its near-zero coefficient of linear thermal expansion which results in a high thermal shock resistance, and its high negative temperature coefficient of electrical resistivity. Such physical properties are desirable for products used in high temperature applications such as required of thermal insulators, ablators, furnace liners, and crucibles. However, several shortcomings or drawbacks have prevented satisfactory utilization of aluminum titanate in such applications. For example, in the past the use of aluminum titanate in space and nuclear applications has been somewhat inhibited by the poor sintering characteristics of aluminum titanate. Previous efforts have demonstrated that the main impediment to wide application of aluminum titanate has been its incapability to form a hard mass by sintering. Efforts to improve the sinterability of aluminum titanate have largely been unsuccessful. Increasing the content of the aluminum oxide from approximately equal molar proportions to enhance sinterability resulted in an increased coefficient of thermal expansion. On the other hand, an increase in the titanium oxide resulted in a decrease in the refractoriness and strength of the material. Such increases in the titanium oxide or aluminum oxide also increased the porosity and the fired shrinkage of the formed bodies. Further, the use of known sintering aids proved unfruitful since such additions critically degraded the advantageous properties known to be present in the pure aluminum titanate compound.

Accordingly, it is the principal objective or aim of the present invention to provide a method for preparing sinterable aluminum titanate ($Al_2TiO_5$ or $Al_2O_3 \cdot TiO_2$) powder and products therefrom which are characterized by an average linear coefficient of thermal expansion of less than $1 \times 10^{-6}$ in./in.° C. over a temperature range of about 25° C. to 1000° C. Such products in thin-walled configurations such as crucibles have an average compressive strength of 5,000 p.s.i. and a density greater than 85 percent of theoretical density (3.73 gms./cc.) when isostatically pressed and sintered, and a density of approximately 70 percent of theoretical density when slip cast and sintered. Generally, the method for preparing the aluminum titanate powder comprises the steps of mixing a solution of an aluminum compound at a plus-3 valence state and a titanium compound at a plus-4 valence state, coprecipitating the aluminum and titanium from solution as aluminum titanium hydroxide, filtering the precipitate, drying the precipitate, and thereafter calcining the aluminum titanium hydroxide at a temperature adequate for removing volatiles and increasing the average size of the particulates. The resulting calcined $Al_2TiO_5$ powder may then be formed into the desired product configuration by isostatic pressing and sintering, by slip casting and sintering, or by any other suitable powder metallurgical technique.

Other and further objects of the invention will be obvious upon an understanding of the illustrative method about to be described, or will be indicated in the appended claims, and various advantages not referred to herein will occur to one skilled in the art upon employment of the invention in practice. Previous efforts have indicated that only the range of 45–52 mole percent $Al_2O_3$ will give coefficients of thermal expansion that are less than $1 \times 10^{-6}$ in./in.° C. over the desired temperature range. Thus, since only this interval would give the maximum thermal shock resistance and since a 50–50 composition (pure $Al_2TiO_5$) would provide near zero thermal expansion behavior, the description below is directed to the preparation of "sinterable" 50–50 $Al_2TiO_5$ powder. However, compositions of $Al_2O_3$ and $TiO_2$ were coprecipitated in molar proportions of 1:1, 1:3, and 3:1 so as to illustrate the applicability of the method of the present invention for preparing any desired composition in the $Al_2O_3$-$TiO_2$ system.

Described generally the sinterable powder of an aluminum titanate ($Al_2TiO_5$) is provided by the steps of preparing solutions containing equimolar proportions of an aluminum compound in the plus-3 ion or valence state and a titanium compound in the plus-4 ion or valence state, coprecipitating the aluminum and titanium as a hydroxide, collecting the precipitate, drying the precipitate and calcining the resulting hydrated powder in air at a temperature of 700–800° C. for a duration of 5–40 hours. Successful coprecipitation of sinterable $Al_2TiO_5$ powder can be achieved by the synthesis of a 50–50 mole per cent aluminum oxide-titanium oxide mix involving the hydrolysis of metal alkoxides in benzene. For example, under an argon atmosphere aluminum isopropylate, $Al(OC_3H_7)_3$, was dissolved in benzene. Titanium isopropylate, $Ti(OC_3H_7)_4$, was added to this solution. The solution was then refluxed for several hours and allowed to cool. Demineralized water was then added dropwise to the resulting solution as the latter was vigorously stirred in order to hydrolyze the organometallics therein. An excess of water was added to increase the speed of the filtration process. To remove the alcohol and water which still remained on the hydrolyzed powder after its synthesis from the aforementioned or other alkoxides the hydrated aluminum titanium powder was placed in a vacuum oven at a pressure of about 125 mm. Hg and heated at 20° to 60° C. for 12 to 48 hours. Surface area measurements by nitrogen absorption techniques indicated a surface area of 330 m.²/gm. which corresponds to an average particle size in the range of 50 angstroms. The dry powder was then calcined in air at a temperature of 700–800° C. for 5–40 hours, which calcining considerably increased the particle size of the powder to a size in the range of 600 to 650 angstroms. If the powder is removed from the furnace while hot, a yellow coloration may be noted which is indicative of a slight oxygen deficiency. However, upon cooling the powder will return to a white color. Other alkoxides which may be satisfactorily employed in the coprecipitation process above described include ethylates, butylates and *tert*-amylates. Also, hydrocarbon diluents for the alkoxides other than benzene may be employed. For example, toluene, hexane, and xylene have proven to be satisfactory.

Alternatively, sinterable $Al_2TiO_5$ powder can be prepared from water-soluble aluminum and titanate salts such as chlorides or nitrates. For this variation of the method solutions of the aluminum salt and the titanium salt are prepared and standardized. If necessary, the titanium salt solution may be oxidized with an acid such as HCl to assure the presence of the plus-4 ion state. Equimolar portions of these solutions are then mixed together and rapidly added to an aqueous solution containing a hydroxide such as ammonium hydroxide to effect coprecipitation of the aluminum and titanium with the hydroxide. The precipitated ammonium titanium hydrate is then dried in a vacuum oven at a temperature of 100° C. or more and calcined in a manner similar to that described above using the aluminum titanium alkoxide approach.

Calcining the aluminum titanium powder prepared by either of the afore-described processes removes volatile material and increases particle size for preventing shrinkage during sintering which would cause a considerable loss of strength and promote deleterious cracking. These calcined powders may be formed into a desired product configuration by employing any suitable metallurgical procedure. For example, calcined $Al_2TiO_5$ powder can be isostatically pressed at 15,000-50,000 and sintered at a temperature of about 1300-1700° C. in an inert atmosphere such as argon for a period of 1-6 hours. The sintered product is black in appearance, which is indicative of an oxygen deficiency in the product but X-ray diffraction patterns indicate that pure $Al_2TiO_5$ is present. Reoxidation of the product at 700-800° C. for 6 hours to one week resulted in the material becoming white with no change in the diffraction pattern. The calcined material may also be sintered in air for producing strong white bodies of $Al_2TiO_5$. Measurements on pellets sintered in argon at 1600° C. for one hour indicated a compressive strength of 31,000 p.s.i. and a coefficient of linear thermal expansion of less than $1 \times 10^{-6}$ in./in.° C. from room temperature to 1000° C. with a total expansion of less than 0.1 percent over this temperature range. More complex shapes such as crucibles may be prepared by isostatically pressing and sintering techniques. These relatively thin-walled products have an average bulk density of about 85 percent theoretical, an average compressive strength of 5,000 p.s.i., and a coefficient of linear thermal expansion of less than $1 \times 10^{-6}$ in./in.° C. in the temperature range of 25-850° C.

Slip casting, which is a relatively economical technique of producing ceramic products of various complex shapes and sizes, may be used to form $Al_2TiO_5$ products. In slip casting a fluid suspension of $Al_2TiO_5$ powder in a liquid which is known as a "slip" or slurry is poured into a mold (a negative of the desired shape made from plaster, or the like). By capillary action of the pores in the plaster the liquid from the suspension is drawn into the mold leaving the powder adhering to the walls of the mold so as to form a "green" casting. The green casting will shrink upon drying and pull away from the walls of the mold so as to facilitate its removal. After such removal the green casting is allowed to dry and sintered at temperatures and durations similar to those employed for the isostatically pressed powder. In order to successfully slip cast $Al_2TiO_5$ powder a medium must be employed to keep the powder in suspension during the casting. Several suspension agents such as sodium alginate, sodium carboxymethylcellulose or sodium carbonate and sodium silicate in a 1:1 mixture may be used but it has been found that an aqueous 0.5 weight percent sodium alginate solution is the most stable. The calcined aluminum titanate powder is ground in a mortar-and-pestle and sieved to −200 mesh for removing the larger agglomerates and effecting a more uniform particle size. The aluminum titanate powder and an aqueous 0.5 weight percent sodium alginate sodium were combined using an electric mixer. A small amount of the powder was added at a time and the batch was allowed to mix for two or more hours before casting. It was found that suspensions containing over about 43 percent solids were too viscous for casting but that satisfactory castings were provided by using a suspension with a solid/liquid ratio of 43 grams of aluminum titanate to 57 milliliters of water. An aqueous solution containing 0.2 weight percent ammonium alginate was poured into the mold and immediately poured therefrom to provide a releasing agent. After the mold had dried it was filled with the slip or suspension. When the desired wall thickness was attained (usually about 45 minutes yields 1/16-1/8-inch walls on a green casting) the mold was turned upside down and excess slip drained off. After the green casting pulled away from the mold it was removed and air-dried before being placed in an oven at 50° C. for a period of about 24 hours. The dried casting was then sintered as described above.

The pH of the $Al_2TiO_5$ solution has an important influence on the viscosity of the slip with the ideal viscosity of the slip occurring during a pH interval of 11.6 to 11.9. To obtain this pH the solution may be treated with sodium hydroxide or any other suitable hydroxide. The theoretical density of a slip with the 43 gm./57 mil solid/liquid ratio is 1.46 gms./cc. and the measured density is 1.47 gms./cc. Particle size distribution of the slip indicates that 90 percent of the particles are under 36 micrometers. From experimental data it was determined that the average dry shrinkage was 30 volume percent, sintered shrinkage was 50 volume percent and the total shrinkage was 65 volume percent. Densities of the sintered shapes varied from 60-80 percent of theoretical averaging about 2.62 gms./cc. for 5 slip-cast samples. X-ray diffraction analysis on a crushed slip-cast and sintered crucible revealed that only aluminum titanate was present.

In order to provide a more facile understanding of the present invention the examples relating to typical preparation of sinterable aluminum titanate powder by coprecipitation are set forth below. For the purpose of these examples the products of aluminum titanate were prepared by isostatically pressing and sintering but it is to be understood that the afore-described slip-casting technique may be similarly employed.

EXAMPLE I

Sinterable aluminum titanate was prepared under an argon atmosphere by dissolving one kilogram of aluminum isopropylate in two liters of benzene, and adding to the resulting solution 736 milliliters of titanium isopropylate. The benzene solution was refluxed for 3 hours to insure homogeneity of the solution and then allowed to cool. The aluminum and titanium isopropylates were hydrolyzed and coprecipitated from the solution by adding with demineralized water dropwise to the solution as it was being stirred. The hydroxides thus formed were collected by filtration and vacuum dried in an oven at 50° C. for 48 hours. The dried hydroxides were calcined at 800° C. in air for 40 hours. The aluminum titanate hydrate powder had an average particle size of 50 angstroms before calcining and an average particle size of 650 angstroms after calcining. The calcined product was compacted into a cylinder 1 inch in length by 0.25 inch in diameter at an isostatic pressure of 30,000 p.s.i., and sintered at 1650° C. for 2 hours in an argon atmosphere. Analytical data indicated the cylinder had a bulk density of 3.16 gm./cc. which is 85 percent of theoretical, an average compressive strength of 5,000 p.s.i., and an average coefficient of linear thermal expansion of $0.5 \times 10^{-6}$ in./in.° C. in the temperature range of 25-850° C.

EXAMPLE II

Sinterable aluminum titanate was prepared and formed into a cylinder by the steps of preparing and standardizing two aqueous solutions, one containing 0.7280 mole/l. of aluminum chloride and a second containing 2.103 mole/l. of titanic chloride oxidized with nitric acid to assure the plus-4 valence state. An aliquot containing 1.138 mole of aluminum was mixed with an aliquot containing 0.69 mole of titanium. The mixture was poured into a rapidly stirred aqueous solution containing 210 gm./l. of ammonium hydroxide. The aluminum and titanium were coprecipitated with the ammonium hydroxide, collected by filtration, vacuum dried at 100° C. for 24 hours and then heated at 700° C. for 4 hours in an argon atmosphere to calcine the precipitate and expel any entrapped ammonium chloride. The calcined powder was compacted in the form of a cylindrical-shaped product having a length of one inch and a diameter of 0.25 inch and then sintered in an argon atmosphere at 1600° C. for 2 hours. Analytical data indicated the cylinder or sintered aluminum titanate had a bulk density of 3.17 gm./cc. which is 85 percent of theoretical, an average compressive strength of 5,000 p.s.i., and an average coefficient of linear thermal expansion of $0.5 \times 10^{-6}$ in./in.° C. in the temperature range of 25–850° C.

It will be seen that the present invention sets forth a coprecipitation method of preparing sinterable $Al_2TiO_5$ powder which represents a significant advancement in the ceramic art.

What is claimed is:

1. A method for preparing sinterable aluminum titanate powder, comprising the steps of mixing a solution containing equal molar proportions of an aluminum alkoxide at a plus-3 valence state selected from the group consisting of aluminum isopropylate, aluminum ethylate, aluminum butylate, and aluminum *tert*-amylate and a titanium alkoxide at a plus-4 valence state selected from the group consisting of titanium isopropylate, titanium ethylate, titanium butylate, and titanium *tert*-amylate in a hydrocarbon diluent coprecipitating the aluminum and titanium from solution as aluminum titanium hydroxide by adding water, filtering the precipitate, drying the precipitate by heating the precipitate at a temperature of 20 to 60° C. for a duration of 12 to 48 hours, and thereafter calcining the aluminum titanium hydroxide at a temperature in the range of 700 to 800° C. for a duration of 5 to 40 hours for removing volatiles and increasing the average size of the powder particulates to a size in the range of about 600 to 650 angstroms.

2. The method for preparing sinterable aluminum titanate as claimed in claim 1, wherein the solution from which the coprecipitation occurs is an alkoxide diluent selected from the group consisting of benzene, toluene, xylene, and hexane, and wherein the step of coprecipitating the aluminum and titanium from said solution is provided by the step of adding water droplets to the solution.

3. A method of preparing an aluminum titanate product comprising the steps of mixing a solution containing equal molar proportions of an aluminum alkoxide at a plus-3 valence state selected from the group consisting of aluminum isopropylate, aluminum ethylate, aluminum butylate, and aluminum *tert*-amylate and a titanium alkoxide at a plus-4 valence state selected from the group consisting of titanium isopropylate, titanium ethylate, titanium butylate, and titanium *tert*-amylate, in a hydrocarbon diluent, coprecipitating the aluminum and titanium from solution as aluminum titanium hydroxide by adding water, filtering the precipitate, drying the precipitate, thereafter calcining the aluminum titanium hydroxide at a temperature adequate for removing volatiles and increasing the average size of the powder particulates, forming the calcined powder into a desired product configuration, and thereafter sintering the powder at a temperature of 1300 to 1700° C. for a duration of 1 to 6 hours, said product being characterized by a coefficient of linear thermal expansion of less than $1 \times 10^{-6}$ in./in.° C. in a temperature range of 25–850 C.

References Cited

UNITED STATES PATENTS

| | | | |
|---|---|---|---|
| 2,948,628 | 8/1960 | Wainer | 423—598 X |
| 3,413,083 | 11/1968 | Daindliker | 423—598 X |
| 3,647,364 | 3/1972 | Mazdiyasni et al. | 433—598 |
| 1,822,848 | 9/1931 | Barclay | 423—598 X |
| 2,942,941 | 6/1960 | Merker | 423—598 |

HERBERT T. CARTER, Primary Examiner

U.S. Cl. X.R.

264—86, 65; 106—55, 65